(12) United States Patent
Maloney

(10) Patent No.: US 6,232,876 B1
(45) Date of Patent: May 15, 2001

(54) MOBILE OBJECT TRACKING SYSTEM

(75) Inventor: William C. Maloney, Marietta, GA (US)

(73) Assignee: Key-Trak, Inc., Duluth, GA (US)

( * ) Notice: Subject to any disclaimer, the term of this patent is extended or adjusted under 35 U.S.C. 154(b) by 0 days.

(21) Appl. No.: 09/392,175

(22) Filed: Sep. 9, 1999

Related U.S. Application Data

(60) Provisional application No. 60/099,954, filed on Sep. 11, 1998.

(51) Int. Cl.[7] .................................................. G08B 13/14
(52) U.S. Cl. ................................. 340/568.1; 340/572.1; 206/459.1
(58) Field of Search ............................. 340/568.1, 568.2, 340/568.7, 571, 572.1, 572.8, 572.9, 825.31, 825.49, 825.34, 573.1, 573.4, 309.15, 309.2; 235/381, 383, 385; 221/13, 124, 130; 206/37.4, 37.6, 37.8, 459.1, 459.5

(56) References Cited

U.S. PATENT DOCUMENTS

| | | | |
|---|---|---|---|
| 2,859,789 | * 11/1958 | Buckett | 206/37.4 |
| 3,451,043 | 6/1969 | Krause | 235/385 |
| 4,209,787 | 6/1980 | Freeny, Jr. | 340/524 |
| 4,275,385 | 6/1981 | White | 340/825.49 |
| 4,419,734 | 12/1983 | Wolfson et al. | 702/109 |
| 4,519,522 | 5/1985 | McElwee | 221/13 |
| 4,549,170 | 10/1985 | Serres et al. | 340/568.1 |
| 4,575,719 | 3/1986 | Bertagana et al. | 340/825.35 |
| 4,595,922 | * 6/1986 | Cobb et al. | 340/572.1 |
| 4,635,053 | 1/1987 | Banks et al. | 340/825.31 |
| 4,636,950 | 1/1987 | Caswell et al. | 705/28 |
| 4,658,357 | 4/1987 | Carroll et al. | 705/32 |
| 4,673,915 | 6/1987 | Cobb | 340/330 |
| 4,737,910 | 4/1988 | Kimbrow | 705/28 |
| 4,796,209 | 1/1989 | Burk | 700/302 |
| 4,799,587 | * 1/1989 | Desanto | 206/37.6 |
| 4,814,592 | 3/1989 | Bradt et al. | 235/381 |
| 4,827,395 | 5/1989 | Anders et al. | 340/10.1 |
| 4,845,492 | 7/1989 | Cobb et al. | 340/825.49 |
| 4,853,692 | 8/1989 | Wolk et al. | 340/573.1 |
| 4,866,661 | 9/1989 | dePrins | 235/382 |
| 4,889,977 | 12/1989 | Haydon | 235/375 |
| 4,926,161 | 5/1990 | Cupp | 340/988 |
| 5,021,778 | 6/1991 | Walton | 340/10.34 |
| 5,038,023 | * 8/1991 | Saliga | 235/385 |
| 5,062,151 | 10/1991 | Shipley | 359/154 |
| 5,172,829 | * 12/1992 | Dellicker, Jr. | 221/13 |
| 5,182,570 | 1/1993 | Nysen et al. | 343/795 |
| 5,218,344 | 6/1993 | Ricketts | 340/573.4 |
| 5,287,414 | * 2/1994 | Foster | 235/383 |
| 5,319,544 | 6/1994 | Schmerer et al. | 705/28 |
| 5,335,170 | 8/1994 | Petteruti et al. | 705/28 |
| 5,374,815 | 12/1994 | Waterhouse et al. | 235/383 |
| 5,402,104 | 3/1995 | LaRosa | 340/539 |
| 5,404,384 | 4/1995 | Colburn et al. | 377/6 |
| 5,426,284 | 6/1995 | Doyle | 705/28 |

(List continued on next page.)

FOREIGN PATENT DOCUMENTS

| | | |
|---|---|---|
| WO9504324 | 2/1993 | (WO) . |
| WO9512858 | 5/1995 | (WO) . |

Primary Examiner—Van T. Trieu
(74) Attorney, Agent, or Firm—Womble Carlyle Sandridge & Rice

(57) ABSTRACT

A mobile object tracking system is provided for tracking the removal and use of specific objects within a group checked out from storage between the time the objects are checked out and the replacement of the objects in the storage. The system includes a system controller and a storage unit that receive and store a series of object carriers therein. Each object carrier includes a series of object holders in which id tags for the group of objects checked out of the storage are received. The object carrier monitors the time each object is removed from the object carrier, which information is thereafter communicated to the system controller.

4 Claims, 11 Drawing Sheets

U.S. PATENT DOCUMENTS

| | | | |
|---|---|---|---|
| 5,521,815 | 5/1996 | Rose, Jr. | 705/28 |
| 5,525,969 * | 6/1996 | Ladue | 340/573.4 |
| 5,528,222 | 6/1996 | Moskowitz et al. | 340/572.7 |
| 5,533,079 | 7/1996 | Colburn et al. | 377/6 |
| 5,612,683 * | 3/1997 | Trempala et al. | 340/825.31 |
| 5,627,520 | 5/1997 | Grubbs et al. | 340/572.1 |
| 5,671,362 | 9/1997 | Cowe et al. | 340/568.1 |
| 5,689,238 | 11/1997 | Cannon, Jr. et al. | 340/572.1 |
| 5,721,531 * | 2/1998 | Garver et al. | 340/568.1 |
| 5,739,765 * | 4/1998 | Stanfield et al. | 340/572.1 |
| 5,777,884 | 7/1998 | Belka et al. | 700/225 |
| 5,801,628 | 9/1998 | Maloney | 340/568.2 |

* cited by examiner

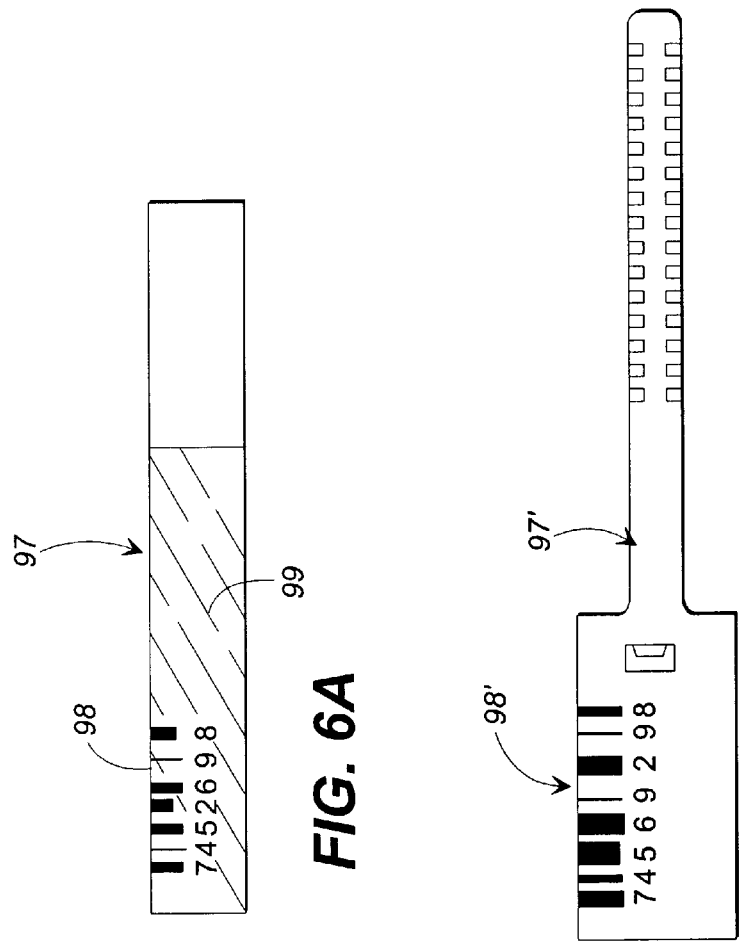
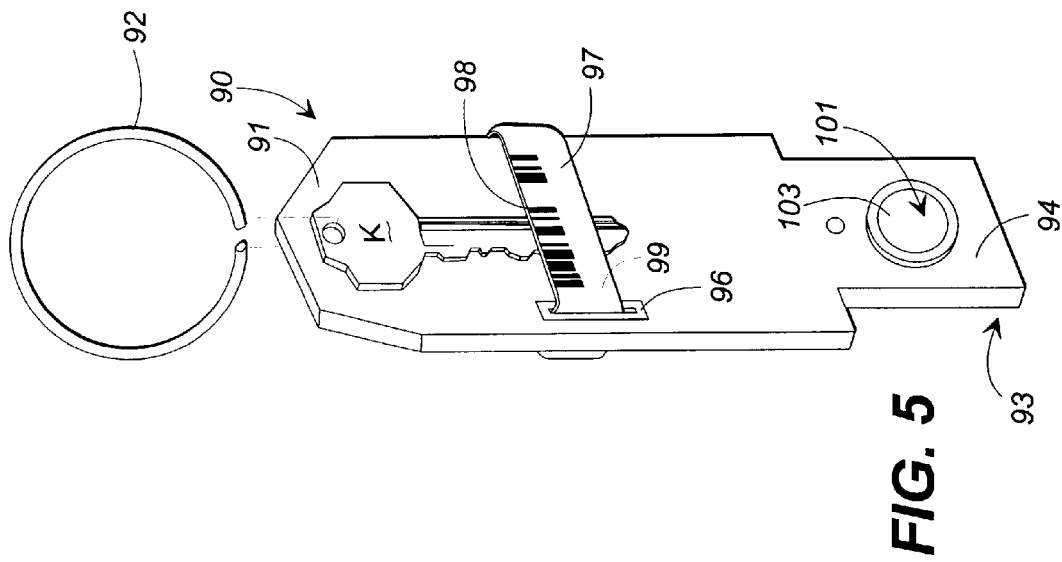

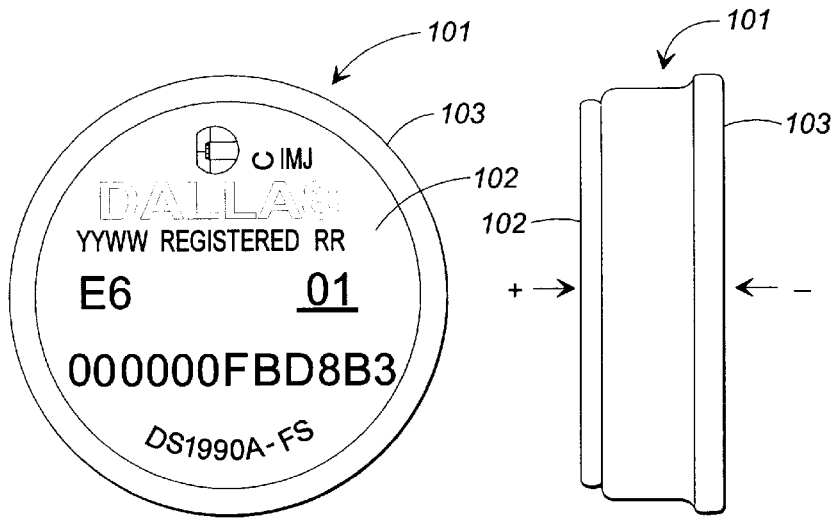
FIG. 7A   FIG. 7B
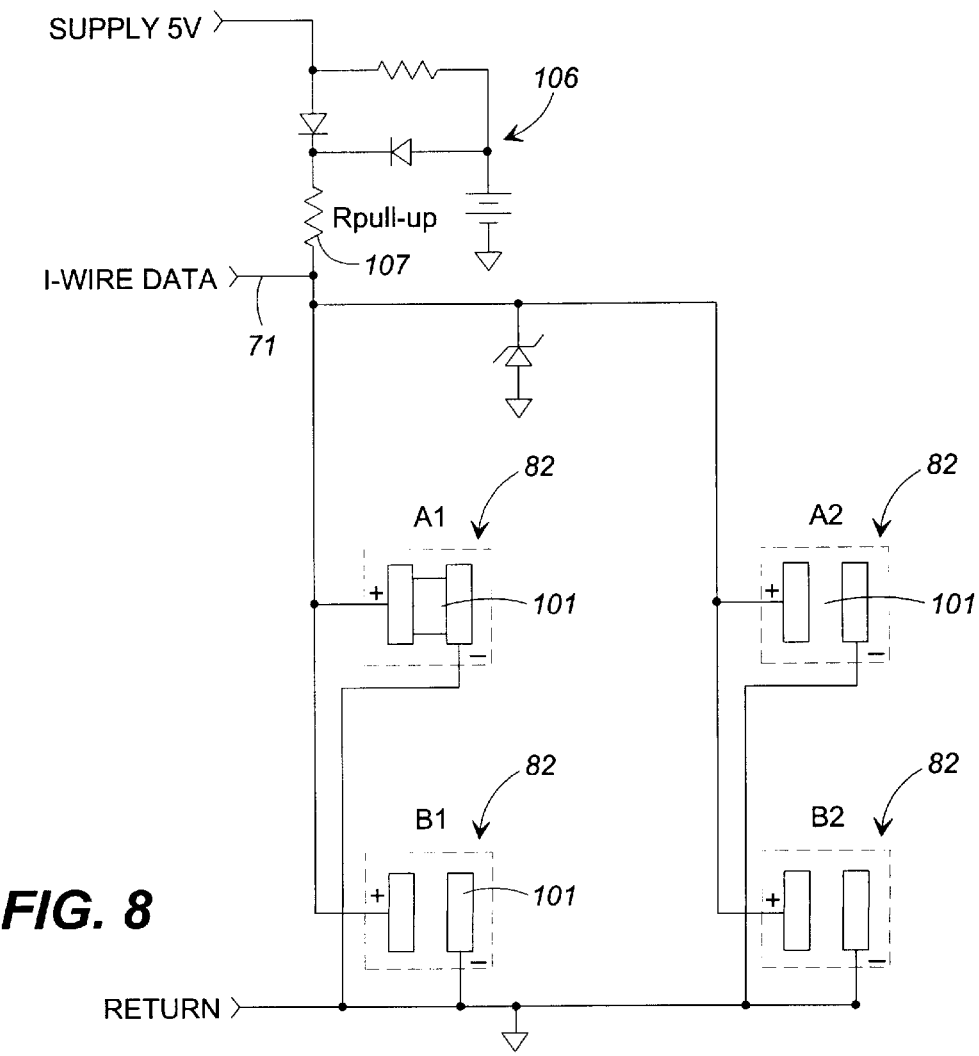
FIG. 8

MOBILE OBJECT TRACKING SYSTEM

REFERENCE TO RELATED APPLICATIONS

This application claims the benefit of the filing date of prior filed U.S. Provisional patent application Ser. No. 60/099,954, filed Sep. 11, 1998.

TECHNICAL FIELD

This invention relates generally to object tracking and control systems and more particularly to systems for tracking and controlling access to and disposition of trackable objects.

BACKGROUND OF THE INVENTION

Access to and control of valuable and/or dangerous items, such as narcotics for example, needs to be carefully monitored, tracked, and controlled to assure against unauthorized access to or assure that proper and appropriate accesses catalogued and monitored. Other items, such as jewelry and coins, have inherent intrinsic value such that it is important for retailers to keep track of access to and location of such items, while keys, such as keys to vehicles, have value because they provide access to other valuable objects such as automobiles and trucks or storage devices. There accordingly is a need to be able to track, catalogue access to, monitor and control such objects in a way that is reliable, simple to implement, and virtually tamper proof In the past, a variety of systems have been implemented to track and control objects. In the case of keys in an automobile dealership, for example, pegboards have been used to keep track of the keys as sales persons, maintenance personnel, and others remove keys for access to vehicles. Generally, sign out sheets have been used to log the check-in and checkout of such keys. Obviously, such a manual system of tracking has numerous shortcomings due in large part to the very real potential of human error and forgetfulness in carrying out the sign-in and sign-out procedures and the inability to monitor how long the keys are out of the storage repository and who has the keys.

More recently, automated computer controlled key tracking systems have been implemented for tracking, for example, vehicle keys at car lots and keys to the apartments of apartment complexes. One such system particularly applicable to the present invention is the key tracking system disclosed and claimed in my U.S. Pat. No. 5,801,628 the disclosure of which are hereby incorporated by reference.

In this system, referred to herein as the "Key Track" system, disclosed and claimed in my U.S. Pat. No. 5,801,628 keys to a vehicle are attached with a rivet or the like to a thin plastic key tag or card having a depending tongue. The tongue carries a small button shaped electronic touch memory device, which stores the ID code. The tongues of the key tags are configured to be insertable in an array of slots formed in a panel within a storage drawer. A printed circuit backplane is disposed beneath the array of slots and is provided with a plurality of pairs of metal contacts, with each pair of contacts being aligned with a corresponding one of the slots. When the tongue of a key card is inserted in a selected one of the slots, its touch memory device is engaged by the corresponding pair of contacts.

A computer based controller is electronically coupled through a data matrix to the contacts on the back plane and periodically polls each pair of contacts, preferably several times per second, to determine the presence or absence of a touch memory device and thus which slots contain key cards and which do not. When a slot contains a key card, the touch memory device of the tag is read to determine its unique code, from which the identity of the particular key attached to the card can be determined through a table lookup. In this way, the absence or presence in location of the key cards and their associated keys can be noted by the controller each time the array of contacts are polled. If a card present in a slot on a prior polling is absent on a subsequent polling, then the controller notes that the card and its key has been removed from the storage drawer. Conversely, if a key card is detected in a previously empty slot, the controller notes that the card and its key have been replaced in the storage drawer. The removal and replacement of keys is therefore continuously monitored.

An access feature requires an authorized user such as a sales person to enter an I.D. code to unlock and access the storage drawer. When the history of removal and replacement of key cards and their keys is combined with other information, such as the time at which cards are removed and replaced and the identities of the person who accessed the drawer and times of access, access to the keys in the drawer can be controlled and a detailed tracking log can be created. This system greatly decreases instances of lost keys, reduces the time required to find checked-out keys, and generally provides automatic tracking and control of the keys, and thus, to a large extent, controls and tracks the vehicles to which they provide access.

While the Key Track system described above has proven extremely successful and valuable in the tracking and control of keys, it nevertheless has certain shortcomings. For example, currently, the system is unable to determine if any of the checked out keys was actually used and if so, for how long. In many applications where this system is to be used, i.e., for armored car companies, the user or "route-man" typically may not know ahead of time exactly every stop he will have to make. Consequently, these users typically will need to take a set of keys, i.e., 10–20 or more, including one or more keys for each stop on their route, whether they will actually need all the keys or not. However, currently it is difficult to track which specific ones of the keys of such a group or set were actually used while checked out and if so, for how long.

Thus, even though the Key Track system has proven very useful and successful, there exists a continuing need to enhance the system in such a way that the problems mentioned above are addressed in an efficient, economic, and reliable way. It is to the provision of such enhancements and improvements that the present invention is primarily directed.

SUMMARY OF THE INVENTION

Briefly described, the present invention, in one preferred embodiment thereof, comprises enhancements to the Key Track system disclosed in my U.S. Pat. No. 5,801,628 incorporated herein by reference. More specifically, the invention comprises a mobile object tracking system for tracking the use of individual objects removed in a group of objects from a location until the replacement of the objects. In a preferred embodiment, the objects to be tracked typically are keys stored on mobile object tracking carriers for monitoring or tracking the use of the keys. However, it should be understood the present invention is applicable for tracking a wide variety of objects other than keys and that the "objects" used to describe the invention in the present application will be understood as being exemplary and are not intended to limit the scope of the invention to only a specific embodiment of the invention.

The mobile object tracking system generally is used either in conjunction with or as a part of the Key Track system disclosed and claimed in my U.S. Pat. No. 5,801,628. The mobile object tracking system generally includes a system controller, typically a computer or microprocessor-based controller, for recording, processing and reporting usage information for the objects being tracked. The system controller is linked to and controls access to one or more storage units in which a series of object carriers are received and stored when not checked out for use by a user. The storage unit generally comprises an enclosure having a locking closure member, such as a door or drawer. This door is typically secured to the enclosure by an electromechanical lock controlled by the system controller in response to the entry of a desired ID code(s).

A series of carrier guides are mounted within the enclosure, and each typically include slotted upper and lower guide plates between which the object carriers are received and are held in an upstanding attitude. A series of communication ports having biased contacts under a printed circuit back-plane extends across the rear of the storage unit. A series of lock mechanisms are positioned adjacent each of the object carrier guides, and generally include electromechanical or electronic locks that each engage an object carrier received within each respective object carrier guide to prevent release of the object carrier until a control signal is received from the system controller to unlock the particular lock.

Each of the object carriers received and locked within the storage unit generally includes a substantially rectangular body, typically formed from a printed circuit board material and generally includes a microprocessor having an internal memory and timer, and a data line, such as a serial bus, extended therethrough. The data line communicates with the microprocessor, which is further connected to a series of contact pads formed along one edge of the object carrier for communicating with the system controller when the object carrier is locked into the storage unit. In addition, at least one lock opening is formed through the body of each carrier. When the object carrier is received within its object assigned carrier guide within the storage device, the contact pads are engaged by the set of biased contacts of a communication port associated with that carrier guide within the storage unit, and a post or bar of the locking mechanism for that particular object carrier guide is extended through the lock opening to lock the object carrier within the storage device.

A series of object holders are mounted to one side surface of each object carrier. Typically, the object holders comprise support brackets generally formed from a metal such as steel or a similar conductive material, and typically include a U-shaped plate having flanged, side edges that are mounted to the body of the object carrier using fasteners or other attaching means. Each of the support brackets forms a substantially rectangular receiving slot or key slot and further includes inwardly projecting spring contact member. A corresponding opening or bore generally is formed through the body of the object carrier opposite the spring contact of each support bracket, exposing the data line.

Typically, an identification tag is attached to each of the objects, i.e. a key, to be tracked by the system. Each identification tag is formed from a hard plastic, metal or similar material to which a key is mounted. In one embodiment of the object carrier, the keys can be further attached to their identification tag using a security ID strap that constricts key movement so that use of the key would require removing or breaking the ID strap. Typically, the ID strap would include a bar code identifier and is formed from a one-time use material to provide a visual indication that the key has been used. When the object carrier is checked in to the storage unit, the user will re-strap the used keys with new straps and scan the bar codes of all keys on the key carrier with a bar code scanner. The Key Track system can then determine which keys potentially were used or not based upon the recognition of original bar codes applied to keys that were not used versus new bar codes for the keys that were used.

In addition, the identification tags also can be provided with a touch memory button mounted at the base of the identification tag. Typically, the memory button will include an internal interval timer and contact surfaces. When an identification tag is inserted into a support bracket, one of the contact surfaces will be engaged and grounded by the spring contact of the support bracket, while the other contact surface will be urged through the corresponding opening or bore in the body of the object carrier into registration and communication with the data line of the object carrier.

When the object carrier is checked out of the storage unit, the Key Track system controller will initialize all identification tag timers and the internal timer of the object carrier processor to zero and start the interval timers and the internal clock of the object carrier, and then will unlock the carrier for removal. Thereafter, while the object carrier is checked out, the removal of any key identification tags from the object carrier will cause the interval timer within the memory button of that tag to halt. Thereafter, upon reinsertion of the key and its identification tag within the support bracket, the memory button is engaged between the grounding spring contact of the support bracket and the data line, causing the interval timer of the memory button to resume counting.

Once the object carrier is checked back into the storage unit, the system controller communicates with the returned object carrier and halts the operation of the interval timers of the identification tags and the internal timer of the object carrier. The elapsed times of each of the interval timers then will be compared with the time that the object carrier was checked out to determine which keys were removed from the object carrier, and thus used, and for how long.

In a further embodiment of the object carrier, the object carrier can include a local intelligence or microprocessor controller that fimctions similar to the key tracking system. The object carrier of this embodiment continually polls or monitors each of the object holders to see which objects, i.e. keys, are present or missing from the object carrier and for tracking how long such objects are removed from the object carrier. The object carrier further generally includes a display and keypad for entering location request information into the microprocessor controller, and addressable switches along its data line for identifying which identification tags, and thus which keys, are located in each particular object holder. In use, the user inputs identification codes for a desired key into the carrier controller, in response to which the location, i.e. the row and column for the object holder containing the desired object, is displayed.

In another embodiment of the object carrier of the present invention, the object holder can include an enclosure or similar storage device formed in the body of the object carrier in place of or in conjunction with the storage brackets, discussed above. The enclosure typically includes a closure member such as a door attached to the body of the object carrier and generally is used for storing documents such as paperwork associated with a set of car keys during servicing of the automobile for tracking the paperwork for an automobile with the keys therefor. Typically, a sensor is mounted within the enclosure, and the object to be stored within the enclosure, i.e. paperwork, will have a corresponding sensor or identification tag such as a reflective tape that is read by the sensor when the object is placed within the enclosure. When the object carrier is returned to the main storage unit, if this paperwork is missing, this absence is detected by the system controller, which activates an alarm or notifies supervisory personnel of a fault condition.

Various objects, features and advantages of the present invention will become apparent to those skilled in the art upon reading the following detailed description, when taken in conjunction with the accompanying drawings:

BRIEF DESCRIPTION OF THE DRAWINGS

FIG. 5 is a perspective view of an identification tag for a key for use with the object carrier of FIG. 3.

FIGS. 6A and 6B are side elevational views illustrating the ample embodiments of the id strap for use with the identification tag of FIG. 5.

FIGS. 7A and 7B illustrate touch memory buttons for use with the identification tag of FIG. 5.

FIG. 8 is a schematic illustration of the operation of circuit of the object carrier of FIG. 3.

DETAILED DESCRIPTION OF PREFERRED EMBODIMENTS

Figure 1:
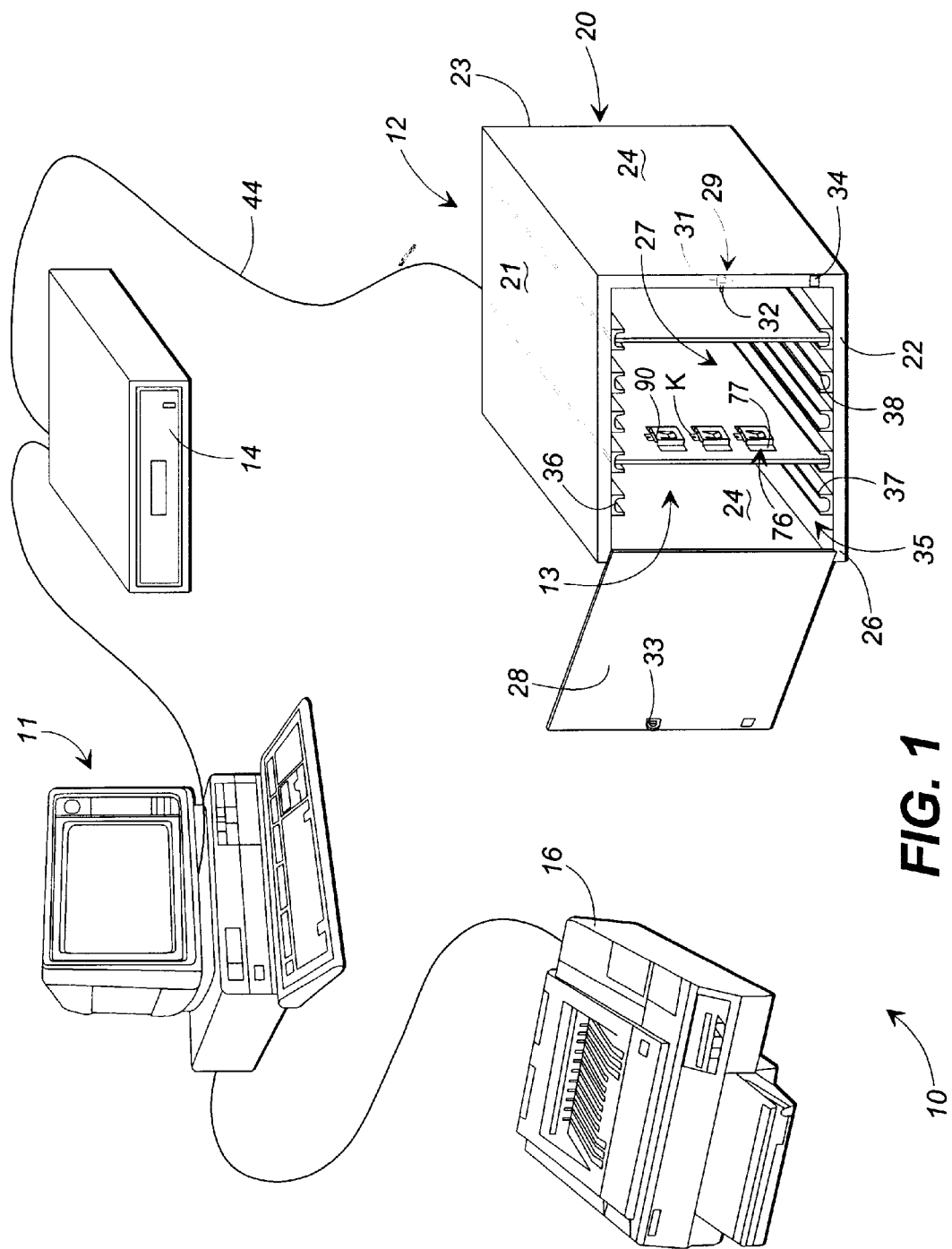
FIG. 1 is a schematic illustration of the mobile object tracking system of the present invention.

Referring now to the drawings in greater detail in which like numerals indicate like parts throughout the several views, FIG. 1 generally illustrates a mobile object tracking system 10 for use in tracking individual objects such as keys, i.e. for vehicles, vaults, etc., checked out in groups or sets of objects. The system will be especially useful for applications where it is necessary for the keys or other objects being tracked to be checked out in groups such as for armored car routes where multiple stops are made, requiring multiple keys to provide monitoring and tracking of use of the individual keys of each checked out or accessed set or group of keys.

It will be understood by those skilled in the art that while the mobile object tracking system of the present invention is disclosed in greater detail below with reference to use in tracking keys, it is possible to utilize the present invention for tracking a variety of objects other than keys as desired, and the disclosed use of the present invention for tracking use of individual keys of a set or group of keys is not intended to impose any limitations on the present invention only to a specific embodiment or field of use. The mobile object tracking system 10 of the present invention further typically is used in conjunction with or as a part of the Key Track system disclosed and claimed in my U.S. Pat. No. 5,801,628, the disclosure of which are hereby incorporated fully by reference.

As indicated in FIG. 1, the mobile object tracking system 10 generally includes a system controller 11, such a conventional personal computer (PC) or other microprocessor based controller as in the Key Track system for receiving, recording and processing information for the keys being tracked, such as the amount of time that each key was actually used or should have been in use, and for accordingly generating reports of such usage information. The system controller 11 generally includes a display monitor and keyboard for inputting user identification information and requests, and is connected to one or more storage units 12 in which a series of portable/mobile object carriers 13, on which groups of keys are stored, are stored when not in use. The system controller further can be connected to an additional storage device such as a drawer 14 or other enclosure, with the drawer 14 and storage unit 12 being connected in series to share a communication port if desired.

Thus, for example, when an armored guard needs to access and remove a series of keys from the storage unit 12, he could first be required to insert his personal vehicle keys, etc., into the drawer 14 and close the drawer before the system controller will allow access to the storage unit. Thereafter, upon return of the selected object carrier(s) containing the group(s) of keys checked out by that guard, the drawer 14 could not be opened to allow him to retrieve his personal keys until the system controller has verified that all of the keys checked out have been returned to the storage unit. In addition, as indicated in FIG. 1, a printer 16 can be connected to the system controller 11 for printing reports of the recorded/processed time of use information for the sets of keys checked out from the storage unit.

Figure 2:
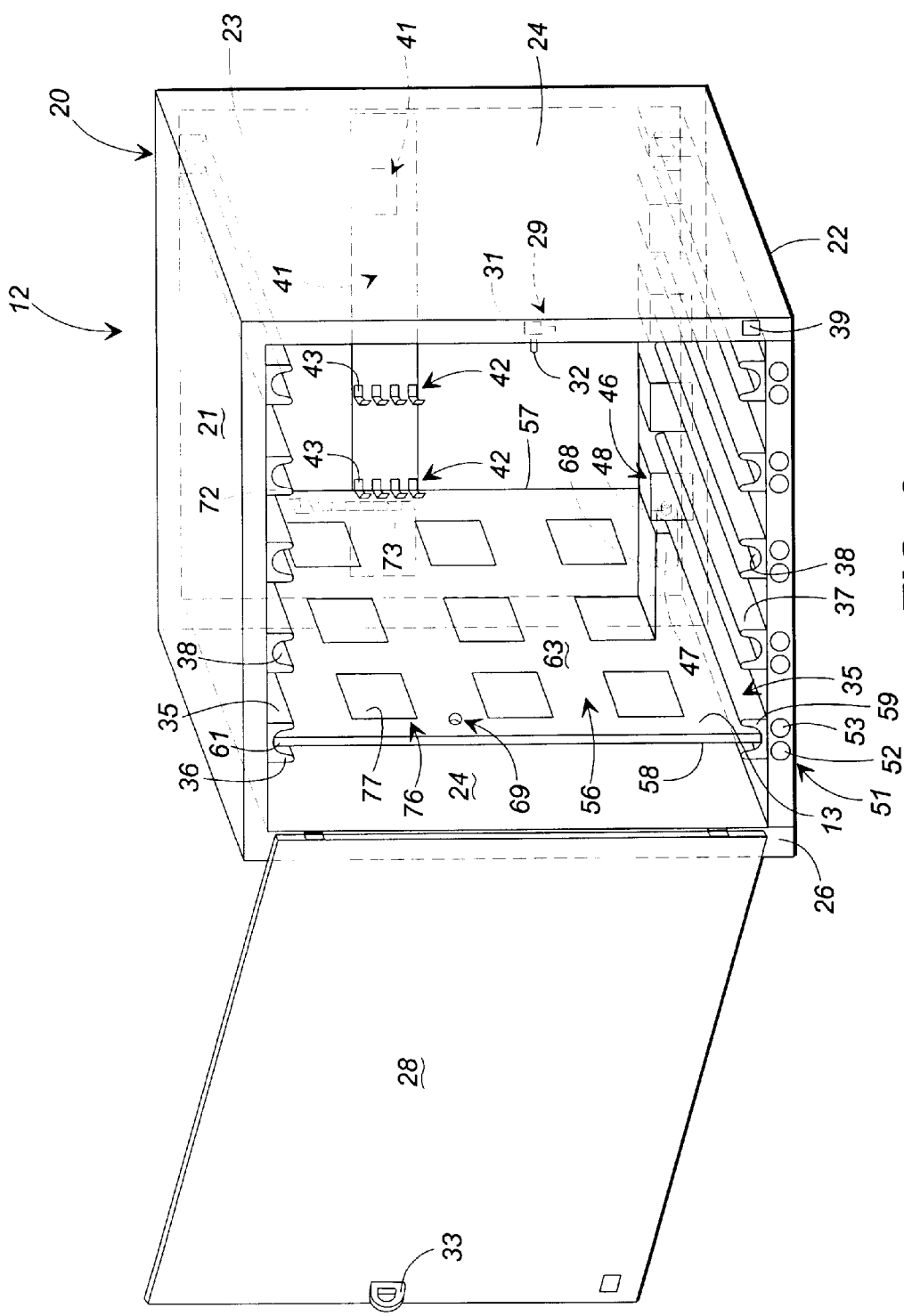
FIG. 2 is a perspective view illustrating the storage unit for use with the object carriers of the present invention.

As illustrated in FIGS. 1 and 2, the storage unit 12 generally comprises a cabinet type enclosure 20 having a top 21, bottom 22, rear wall 23, side walls 24 and an open front portion 26 that define an open-ended chamber 27. Typically, the enclosure cabinet 20 is formed from a high strength security material such as steel or similar metal material to restrict or deter unauthorized access thereto. It will also be understood that while the storage unit 12 is illustrated as a cabinet, other types of enclosures such as a drawer also can be used. The cabinet 20 further includes a door or similar closure member 28 that is hingedly mounted to one of the side walls 24 and is movable from an open position, as shown in FIGS. 1 and 2, to a closed position against the open front portion 26 of the cabinet to seal/enclose the chamber 27.

A latch or lock mechanism 29 generally is mounted along the side wall 24' at the front of the cabinet in a position to engage and secure the door 28 in its closed position. The lock mechanism generally is an electromechanical or electronically operated lock that typically includes an actuator 31 such as a solenoid linked to and controlled by the system controller 11 (FIG. 1). The actuator causes a locking bolt or pin 32 (FIG. 2) to be extended or retracted into and out of engagement with a lock hasp 33 mounted to the door 28 when the door is moved to its closed position against the front of the cabinet and the lock mechanism has been actuated. A door sensor 34 further is mounted to the front of the cabinet in a position to be covered by the door 28 when the door is in its closed position. The door sensor 34 detects the presence/absence of the door to alert the system controller as to whether the door of the storage unit is closed or open.

A series of carrier guides 35 are mounted within the enclosure chamber 22 at spaced positions or locations across the cabinet 20. The carrier guides generally include parallel upper and lower guide plates 36 and 37 positioned opposite and aligned with one another. Each of the guide plates generally is formed from a plastic, metal or similar material and includes a guide slot or groove 38 that extends longitudinally from the front 26 of the enclosure cabinet 20 to its rear wall 23. As FIG. 2 indicates, the object carriers 13 each are slidably received between the upper and lower guide plates 36 and 37 of a carrier guide 35, being engaged and held within the guide slots or groves 38 thereof.

A backplane 41 is extended along the rear wall 23 of the cabinet 20. The backplane 41 generally comprises a printed circuit board having a series of etched traces or wires (not shown) extending therealong, or can comprise a data line that extends horizontally across the rear wall 23 of the cabinet. A series of communication ports 42, each having a series of metal contacts 43, are positioned in spaced intervals along the backplane 41, in positions aligned with each of the carrier guides 35. Each of the contacts 43 generally is formed from a conductive metal such as steel, and engage an object carrier 13 received within their associated carrier guide. The contacts 43 of each of the communication ports 42 communicate through the data line or etched contacts of the backplane of the storage unit with the system controller 11 (FIG. 1) via a communication link 44 to enable key usage and identification information to be downloaded to and received from the system controller 11 at the storage unit 12.

As illustrated in FIG. 2, a series of carrier locks 46 are mounted adjacent the lower guide plates 37 of each of the carrier guides 35, typically adjacent the rear wall 23 of the storage unit. The carrier locks generally are electromechanical or electronically actuated locking mechanisms, and typically include an actuator, shown in dashed lines 47, such as a solenoid, and a lock-pin, shown in dashed lines 48. The lock pin is extended and retracted by the actuator 47 on receipt of control or command signals from the system controller for engaging and locking an object carrier within its associated carrier guide.

Indicators 51, such as LED's 52 and 53 are mounted at the front of each carrier guide 35, as illustrated in FIG. 2. The LED's 52 and 53 can include different color lights, i.e. red and green, that are actuated by the system controller in response to input of an ID code and/or a request for a desired set of keys to indicate the location of the object carrier(s) containing the requested set(s) of keys. The LED's also indicate whether the carrier lock 46 for the requested object carrier has been disengaged so that the requestor knows which object carriers have been released.

Figure 3:
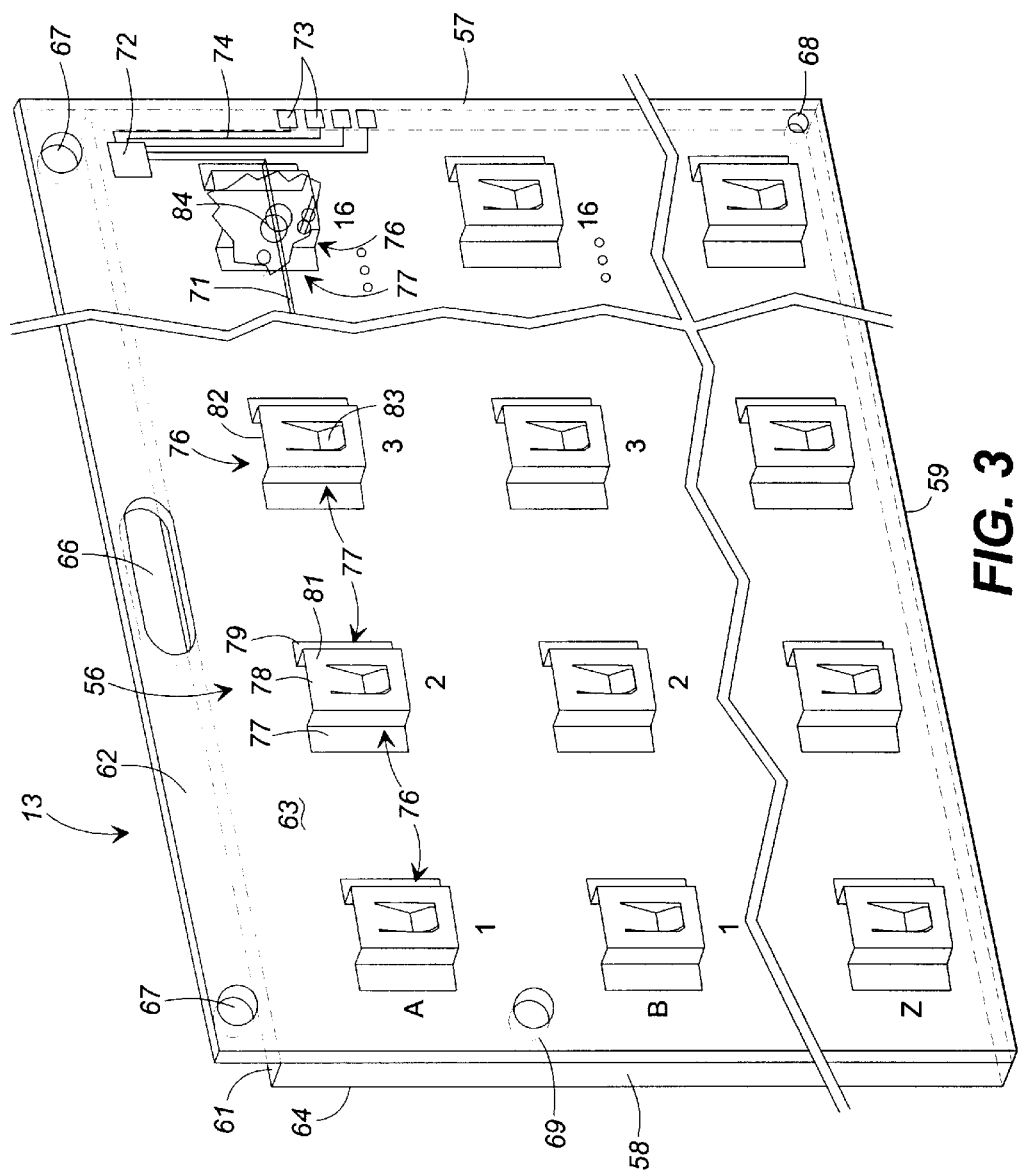
FIG. 3 is a perspective view of a first embodiment of an object carrier of the present invention.

FIG. 3 illustrates a first embodiment of the object carriers 13 on which the keys or other objects to be tracked are stored in sets or groups, such as would be needed for serving a particular armored car route. As shown in FIGS. 1 and 2, the object carriers 13 are received within carrier guides 35 of the storage unit 12, sliding along the guide slots or grooves 38 of the carrier guides. Each of the object carriers 13 generally includes a substantially rectangularly shaped body 56, although other shapes or configurations also can be used as desired. The body 56 typically is a one piece plate or series of parallel plates applied together, and generally is a printed circuit board with a back cover formed from an insulating material. The body 56 also generally includes first and second ends 57 and 58, a lower or bottom surface 59, upper surface 61 with an upper flange portion 62 projecting slightly thereabove and forward and rear facing surfaces 63 and 64.

As FIG. 3 illustrates, a handle opening 66 and carrier openings 67 are formed in the upper flange portion 62 of the object carrier to enable a user to grip and carry and/or hang the object carrier from a hook or similar holding device (not shown) when checked out of the storage unit. A lock opening 68 is formed in the lower front corner of the object carrier body 56, adjacent the bottom 59 and first end or side 57 of the object carrier. The lock opening is engaged by the lock pin 48 (FIG. 2) of the carrier lock 46 for the specific carrier guide 35 in which the object carrier 13 is received in the storage unit 12 for locking the object carrier within the storage unit. In addition, a finger pull opening 69 is formed through the body 56 adjacent the second end or side 58 to enable the user to engage and pull the object carrier out of its carrier guide for removal from the storage unit.

As FIG. 3 illustrates, a data line 71, generally a one wire line although other types of data transmission lines such as a two wire pair serial bus also can be used, is extended through the body of the object carrier 13, typically extending in a serpentine path across the body of the object carrier. The data line 71 generally terminates at an on-board processor/controller 72 such as a microprocessor chip mounted within the body of the object carrier. The on-board controller 72 includes an internal memory and a clock or timer that is initialized and started by the system controller upon selection and removal of the object carrier from the storage unit, and will draw power from an internal power supply mounted in the body of the object carrier. The on-board controller acts as a tracking mechanism that generally monitors or tracks the presence of the keys on the object carrier.

A series of contact pads 73 are mounted along the first end or side 57 of the object carrier, as indicated in FIG. 3, and are linked to the on-board controller 72. The contact pads 73 are mounted in a position to be engaged or contacted by the biased metal contacts 43 (FIG. 2) of the communication ports 42 formed along the backplane 41 of the storage unit when the object carrier is received and locked within its assigned carrier guide within the storage unit. The connection or link established between the contacts 43 of the backplane 41 and the contact pads 73 of each object carrier 13 enables communication between the object carriers and the system controller for downloading usage information from the object carriers to the system controller, such as the amount of time that an individual object stored on the object carrier was removed from the object carrier and thus was supposed to be in use, and for receiving information from the system controller for initializing, resetting and starting the internal timer or clock of the object carrier.

Figure 4:
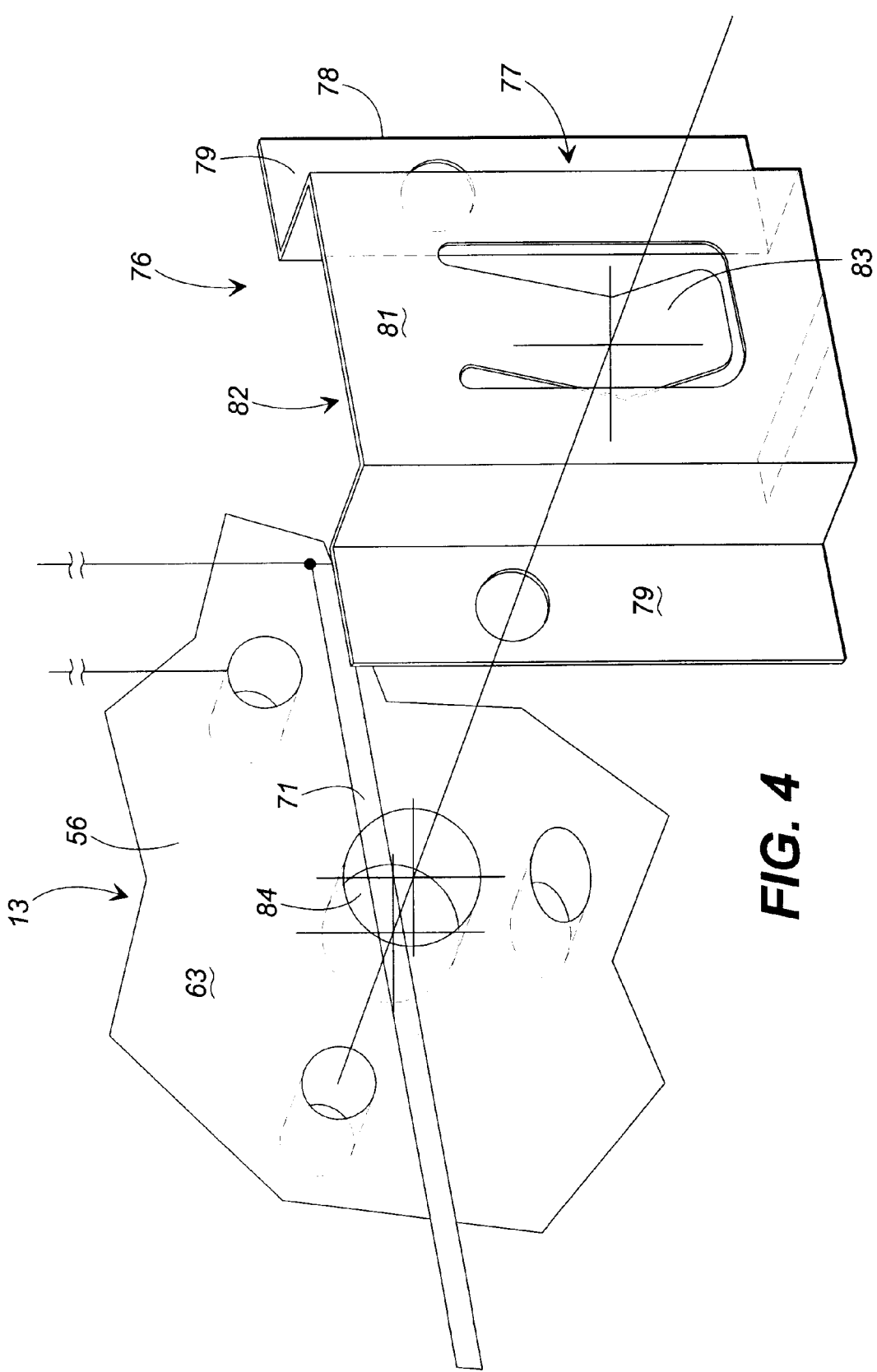
FIG. 4 is an exploded perspective view of a support bracket of the object carrier of FIG. 3.

As illustrated in FIGS. 3 and 4, a series of object holders 76 are mounted along the forward facing surface 63 of the object carrier spaced at locations thereacross. In the present embodiment illustrated in FIGS. 3 and 4, the object holder 76 generally comprises support brackets 77 that are mounted at positions generally aligned along the data line 71 as indicated in FIG. 3. Each of the support brackets generally is a substantially U-shaped plate 78 formed from a metal such as steel or similar conductive material, and includes outwardly flared side portions 79 and a U-shaped body portion 81 that defines a receiving slot or key slot in which the keys or other objects to be tracked are received. As indicated in FIG. 4, each of the support brackets generally is mounted to the forward facing surface 62 of the object carrier body by fasteners (not shown) or an adhesive material generally applied between the outwardly flared side portions 79 and the forward facing surface of the object carrier body.

A spring biased contact member 83 is formed in the body portion 81 of each support bracket, typically formed as a cutout, inwardly projecting tongue that projects into the receiving/key slot 82 of each support bracket 77 to frictionally engage the key or other object received within the support bracket. As illustrated in FIG. 4, a corresponding data opening or bore 84 is formed in the forward facing surface 63 of the object carrier at each support bracket, with the bores or data openings 84 being substantially aligned with the spring contact members 83 of the support brackets. The data openings expose the data line 71 extending through the body of the object carrier as illustrated in FIGS. 3 and 4.

As shown in FIG. 1, a series of identification tags 90 are received within the support brackets 77, generally being frictionally engaged and held within the receiving/key slots of the support brackets by the spring biased contact members 83 (FIG. 3). The identification tags 90 are illustrated in greater detail in FIG. 5, and typically are of the same type or of a similar construction to the identification (ID) tags used in the Key Track system disclosed and claimed in my U.S. Pat. No. 5,801,628 incorporated herein by reference.

Another preferred embodiment uses other use tracking mechanisms other than a microprocessor controller. In such an embodiment the data line 71 is connected directly to the contact pads 73 without a local microprocessor. Two preferred alternate tracking mechanisms for use in such an embodiment include security straps and intelligent touch memory devices, both of which approaches are discussed below.

As FIG. 5 illustrates, each of the identification tags generally is formed from a strip of a plastic, metal or similar material having an upper end 91 at which a key "K" is attached, such as by a keyring 92, or using a fastener such as a rivet or similar fastening mechanism, and a lower end 93 generally formed as a tongue or tab 94 having a reduced width from the upper portion of the identification tag. A slot or notch 96 is formed through the identification tag adjacent the upper end 91. The slot 96 receives a security ID strap 97 that extends about the body of the identification tag and through the slot 96 to prevent the slot from being slid off the identification tag. Example embodiments of the security ID strap 97 and 97' are illustrated in FIGS. 6A and 6B, respectively. The ID straps 97 and 97' each include a bar code, indicated at 98 (FIG. 6A) and 98' (FIG. 6B), and can include a series of score or tear lines 99 (FIG. 6A) formed thereacross. Each security ID strap 97 is applied about the identification tag and key K as shown in FIG. 5, to secure the key against the body of the identification tag. Consequently, before the key can be used, the security ID strap is removed to free the key from its stored position held against the body of the identification tag.

The security ID straps typically are one time use straps such that once they are torn or cut away from the identification tag, they cannot be reused. The security ID straps thus provide a quick visual indication as to which keys of the group of keys stored on the object carrier have been accessed or used. In addition, prior to check out of the object carrier from the home site base location, the bar codes 98 of the security ID straps for each of the keys stored on the object carriers typically are scanned into the system controller using a bar code scanning wand. Upon return of the object carrier to the home/base site, the user will apply new bar coded security ID straps to those identification tags whose ID straps were removed, and will rescan the bar codes for each of the ID straps for each key on the object carrier. This scanned information is inputted into the system controller which can then determine which keys of the group of keys on the object carrier actually were used by recognizing the original bar codes applied to those keys that were not accessed or used, and the new bar codes for those keys of the object carrier that were accessed or used. The optical bar codes can also be replaced with other electronic IDs, such as RF ID tags.

In addition, a touch memory button or chip 101 can be mounted in the tongue 94 of each of the identification tags. The touch memory typically comprises a ROM ID touch memory button, such as, for example, Model DS1990A - Model DS1994 touch memory buttons manufactured by DALLAS Semiconductor. The touch memory button typically includes an internal memory and interval timer that is initialized by the system controller to the data line 71 as the object carrier is checked out of the storage unit. As illustrated in FIGS. 7A and 7B, the touch memory button generally is essentially circular and includes a front, positive terminal or conducting surface 102 and a rear, negative terminal or conducting surface 103 and is mounted with its front conducting surface projecting through the tongue 94 (FIG. 5) of the identification tag 90.

As in the Key Track system, when the identification tag 90 for a particular key is received within its assigned receiving slot 82 (FIG. 3), the rear conducting surface 103 (FIG. 7B) of the touch memory button 101 is engaged by the spring biased contact member 83 (FIG. 3) of the support bracket. The contact member 83 thus serves as a ground conductor for the touch memory button, and urges the forward conducting surface 102 of the touch memory button through the data opening or bore 84 (FIG. 4) into contact with the data line 71 for the object carrier. The engagement of the touch memory button within the data opening 84 of the object carrier firther helps to hold the identification tag in a locked position within its object holder.

Figure 13:
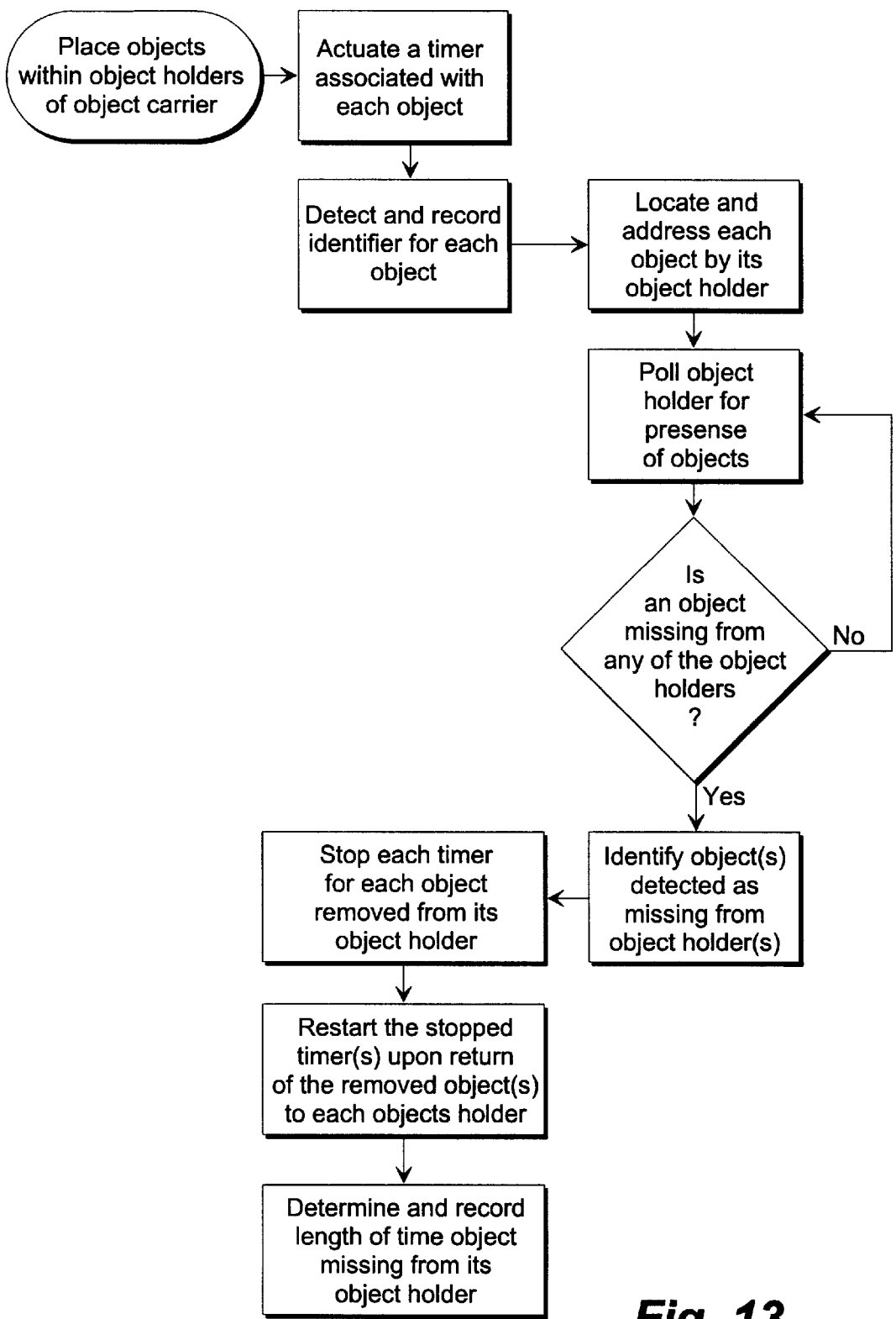
FIG. 13 is a flow chart illustrating the operation of the system for detecting and measuring the time an object is removed from a canier for use.

The touch memory button generally draws power from the data line, so that as the touch memory button is moved into and maintained in engagement with the data line, the internal interval time of the touch memory button is actuated and begins to count. As illustrated in FIG. 13 when an identification tag for a particular key is removed from the object carrier, and thus its touch memory button is removed from engagement with the data line, the interval timer of that touch memory button is stopped. When the identification tag is returned to its support bracket and the touch memory button of that identification tag is re-engaged with the data line, the interval timer of that touch memory button is restarted to provide a count or record of the time that the key was stored on the object carrier.

When the object carrier is returned to the storage unit, the system controller then polls the object carrier to download the time information recorded by the internal timer of the object carrier and the interval timers of each of the identification tags/keys stored on the object carrier. The time recorded by the internal timer of the object carrier is compared with the times recorded by the interval timers of each identification tag/key to determine not only which keys were accessed or used, i.e., removed from the object carrier, but for how long such keys were in use.

A schematic illustration of the basic operational circuit for the object carrier and touch memory buttons 101 for a series of ID tags is as illustrated in FIG. 8. Typically, the location of each support bracket, and thus each key stored therein, is identified using alpha numeric identifiers such as letters for the rows and numbers for the columns, along which the support brackets are positioned to locate the keys on the object carrier, i.e., position A1, position A2, position B1, and position B2, as illustrated in FIG. 8. In one preferred embodiment of the system, the memory button will require a pull up voltage be supplied to each button via the data line 71. This generally is supplied through a battery 106 mounted within the body of the object carrier and which supplies an operational voltage through a series of resistors 107 to the data line. In this embodiment, the touch memory buttons primarily draw power from the data line and battery in a parasitic relationship to maintain the interval timers of each of the memory buttons on. Each of the support brackets or key slots of the object carrier thus generally will be labeled according to the particular key to be stored within that support bracket, i.e., physically labeled with the name of the particular store or business for that key. In addition, the battery 106 can be recharged when the object carrier is stored within the storage unit.

Figure 9:
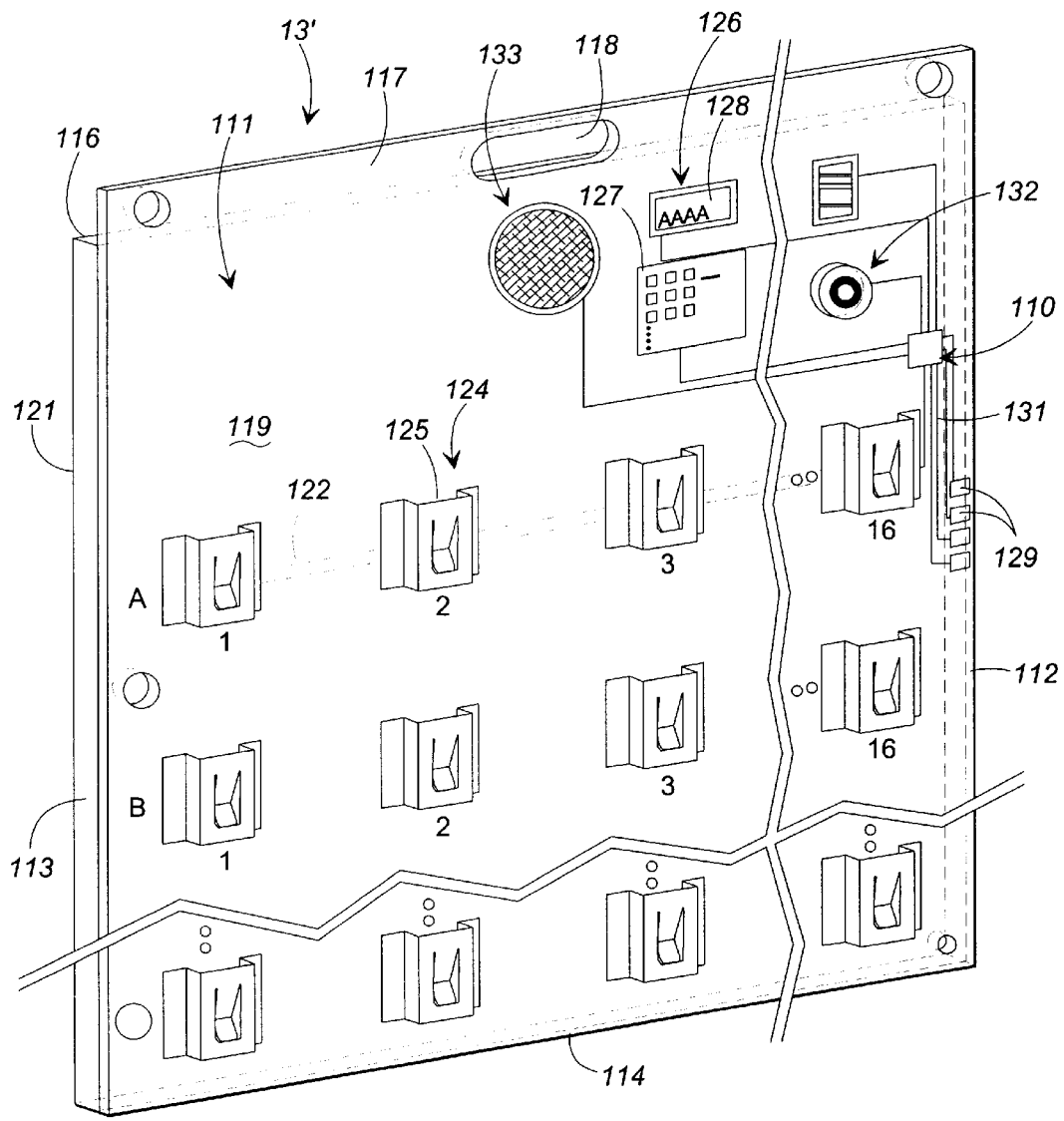
FIG. 9 is a perspective illustration of an additional embodiment of the object carrier of the present invention.

An additional embodiment of the object carrier 13' is illustrated in FIG. 9. In this embodiment of the object carrier 13', the object carrier is provided with active, local intelligence in its controller 110, which typically is a microprocessor based controller having an internal memory and processing capability. In this embodiment of the object carrier 13', the object carrier has a similar construction to that discussed above, including a body 111 having first and second ends or sides 112 and 113, bottom surface 114, upper surface 116 with an upwardly projecting flange 117 having a handle opening 118 formed therein, and forward and rearward facing surfaces 119 and 121. A data line 122, which typically is a one wire line or serial bus is extended through the body 111, along which a series of object holders 123 such as support brackets 124 are mounted. The support brackets define a series of key slots 125 typically arranged in rows and columns or in an alternating configuration across the object carrier and identified by alpha numeric characters to provide an identified location for each key slot.

The embodiment of the object carrier 13' illustrated in FIG. 9 further includes input mechanism 126, here illustrated as a keypad 127 and display screen 128, but which could also take the form of a touch screen or other similar types of input devices. The input mechanism enables the user to communicate with the on-board controller 110 of the object carrier to input programming or key requests. A series of contact pads 129 are mounted along the first end or side 112 of the object carrier and are linked to the on-board controller 110 via wires or conductive PC traces 131 for communicating and transmitting information, including programming commands between the on-board controller of the object carrier 13' and the system controller 11 (FIG. 1).

In addition, a ID port 132 generally is formed in the object carrier and is linked to the on-board controller of the object carrier for inputting a user identification. A speaker alarm 133 also is mounted within the body of the object carrier 13', linked to the on-board controller 110. The speaker alarm is used to provide an audio alarm of the occurrence of a fault condition. For example, if an identification tag is removed from the object carrier without authorization or being requested, or if the user accesses the wrong key for a given stop, or if a key is out too long, an alarm can be sounded.

In a first mode of operation, the controller 110 of the object carrier 13' initially polls the memory buttons of each of the identification tags for each key of the set of keys stored on the object carrier and records preprogrammed identification or serial number. After the object carrier has been checked out of the storage unit, the controller of the object carrier 13' will continually poll the memory buttons of each of the identification tags toward each of the key slots of the object carrier at preset time intervals to search for the recorded ID/serial numbers. If a recorded ID/serial number is not found by the controller during its polling of the memory buttons present on the object carrier, a record is created within the memory of the controller 110 indicating which ID/serial number is missing and at what time. After the identification tag carrying the touch memory button having missing identification/serial number is returned to its key slot, the controller will then read the presence of the missing ID/serial number and will indicate the time at which this ID/serial number was returned to generate a record of which keys were removed from the object carrier and for how long.

Figure 10:
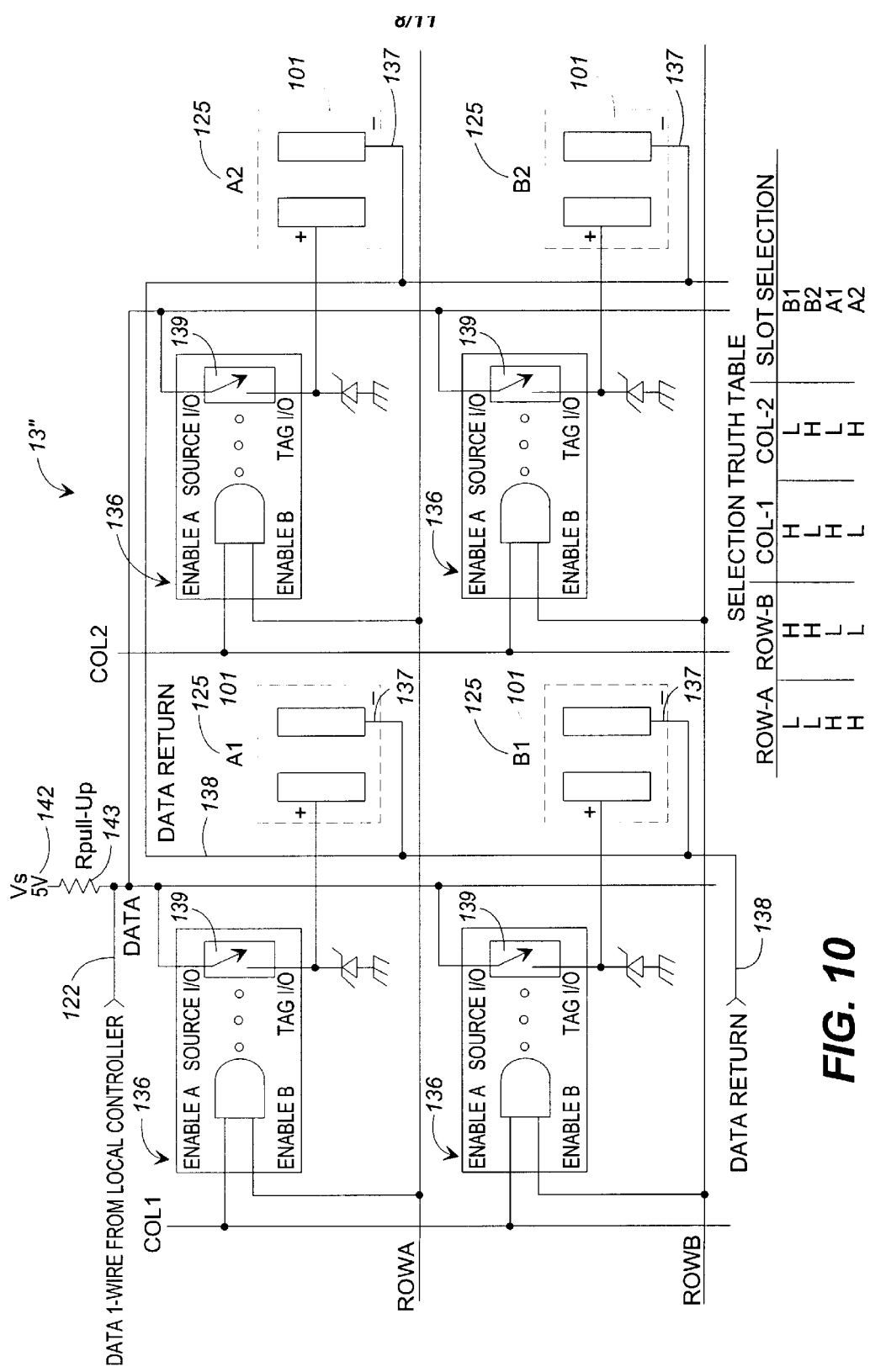
FIG. 10 is a schematic illustration of an embodiment of the operational circuit of the object carrier.
Figure 11:
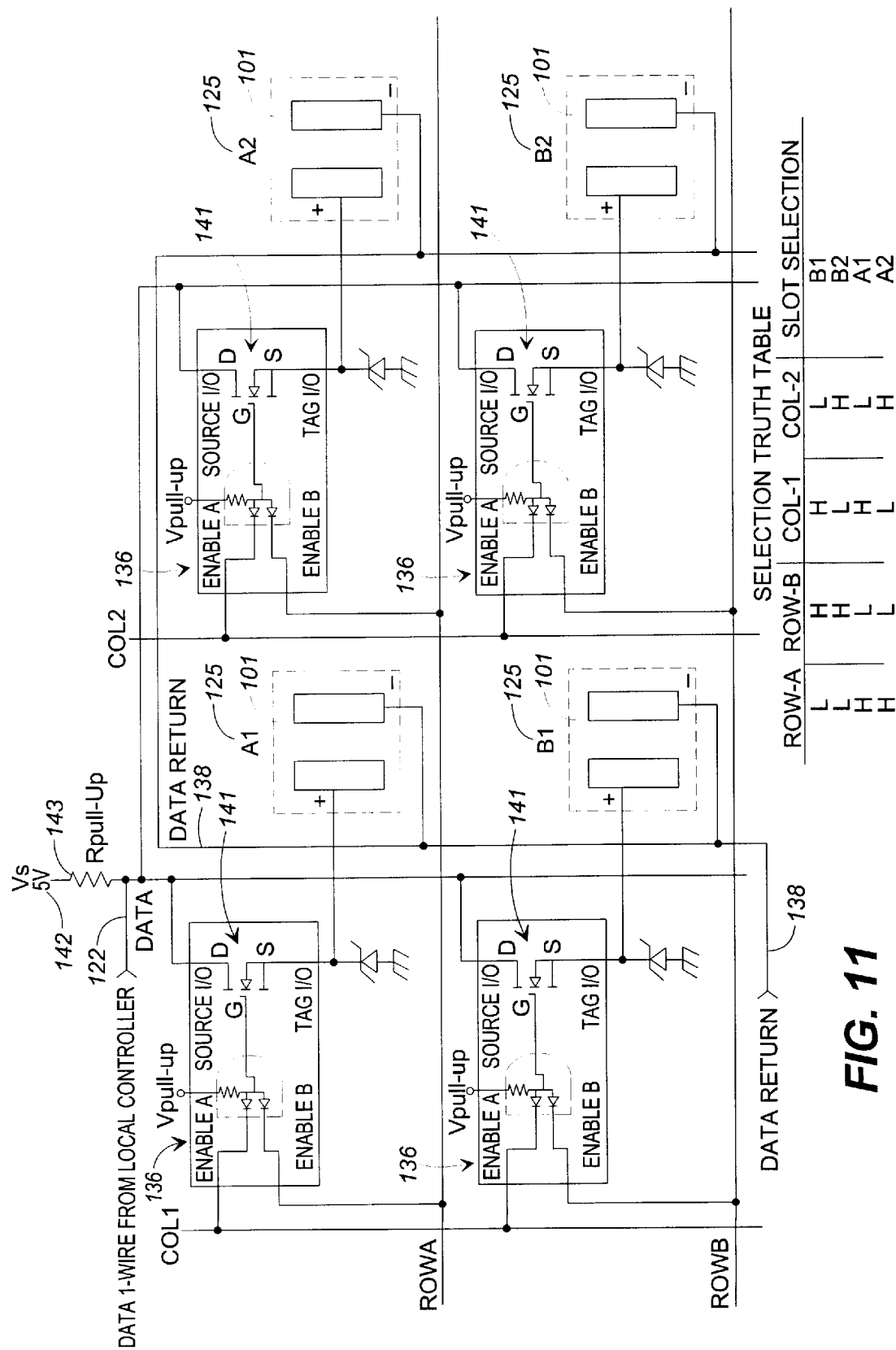
FIG. 11 is a schematic illustration of an additional embodiment of the operational circuit of the object carrier.

In an enhanced operational embodiment of the object carrier 13', as illustrated in FIGS. 10 and 11, a series of addressable switches 136 are positioned along the data line 122 at positions approximately corresponding to each of the identified key slots or support brackets, i.e., locations A1, A2, B1 and B2 as illustrated. The addressable switches 136 enable the controller 110 of the object carrier to identify each particular key stored in which slot, i.e., A1 . . . B2, etc., by matching the internal serial number or ID number of the touch memory button 101 of the particular identification tag for that key with the address or location of the key slot in which the key is received. This enables the user to input an ID code for a desired key or keys into the controller for the object carrier 13' (FIG. 9), in response to which the controller indicates the location/key slot key(s) is stored.

This system and operation are extensible to multiple rows and columns, more than just the two row and two column arrangement shown in FIGS. 10 and 11. As illustrated in FIGS. 10 and 11, the negative terminals 137 of each touch memory button for each key stored on the object carrier 13' generally are connected to a common data ground (return line) 138. Selective communication between each of the self addressed switches is achieved by enabling access of the data signal to each one key slot or port bracket at a time through "AND" circuits 139. To select a particular location, for example, selection of slot A1, corresponding to a row A and a column 1, as illustrated in FIG. 10, the row and column are pulled up to a high state while the other rows and columns remain in a low state. AND circuit 139 of the addressable switch 136 corresponding to slot A1 thus will receive two high inputs and will output a high signal corresponding to the closing of the switch to complete the one wire communication path to slot A1. The AND circuits for each of the addressable switches 136 for the other key slots/locations, i.e., A2, B1 and B2, still have at least one input that is low forces the output of the AND circuit to stay low to prevent the addressable switch from closing and allowing the data signal passing along the one wire data line to propagate, so that no communication is achieved with the nonaccessed key slots.

A further embodiment of the operational circuit for performing this selection and signal switching functionality is illustrated in FIG. 11. In FIG. 11, the "AND" circuits take the form of diodes 141 with the signal switching being achieved using an n-channel FET. In both embodiments of the operational circuit illustrated in FIGS. 10 and 11, a voltage supply 142, such as a rechargeable battery is mounted internally within the body of the object carrier is provided. The voltage supply 142 is connected to the one wire data line, and thus into the controller for a resistor 143 provides a pull up voltage which is accessed by the touch memory buttons received within each of the key slots.

Figure 12:
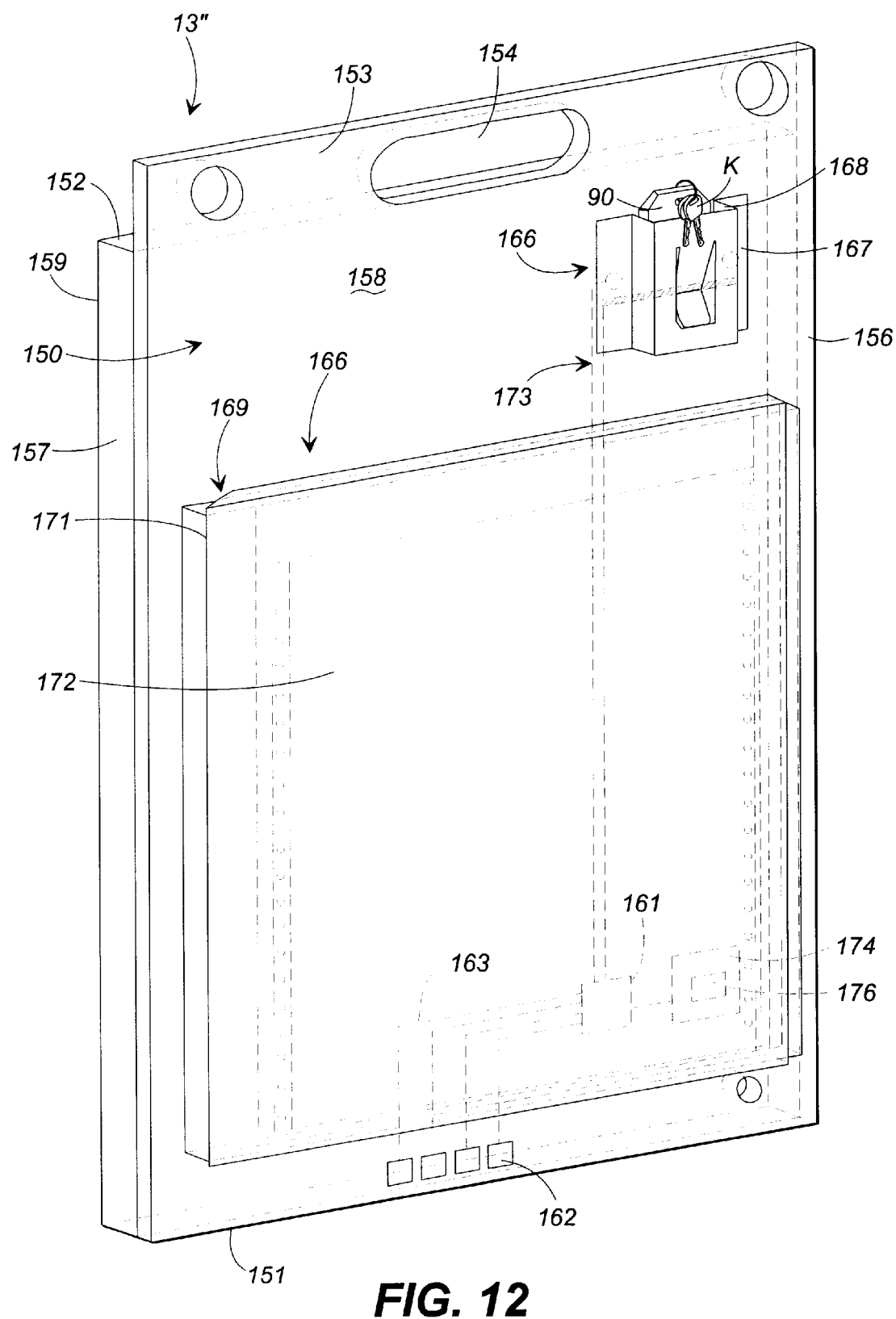
FIG. 12 is a perspective view illustrating a further embodiment of the object carrier of the present invention, including both a support bracket and object enclosure.

Another embodiment of the object carrier 13" is illustrated in FIG. 12. In this embodiment of the object carrier 13', the object carrier includes a substantially rectangular body 150 that is oriented substantially vertically and includes a bottom or lower end 151, upper end 152 in which an upper flange 153 having a handle opening 154 formed therein projects, sides 156 and 157 and forward and rearward facing surfaces 158 and 159. A microprocessor based local controller 161 is mounted within the body 150 of the object carrier 113 and connects to a series of communication contact pads 162 through conductive traces or wires 163 to enable communication between the local controller 161 of the object carrier 13" and the system controller when the object carrier 13" is received and stored within the storage unit.

As FIG. 12 illustrates, object holders 166 are mounted on the forward facing surface 158 of the object carrier 13". In this embodiment, the object holders include at least one support bracket 167, which defines a key receptacle or slot 168 in which an identification tag 90 (FIG. 5) for a key or set of keys K is received, and an object enclosure 169 (FIG. 12) generally adapted to receive and store larger objects such as papers. The present embodiment of the object carrier 13" is particularly suited for applications where it is necessary to match various different objects together. For example, at an automotive dealership or repair shop, the keys of a vehicle being serviced can be kept together with the paperwork, i.e., service order or job ticket, for that vehicle.

Typically, the object enclosure 169 will thus include an enclosure body or chamber 171 mounted to the body of the object carrier 13", and a door or closure member 172 that is hingedly attached to the forward facing surface of the object carrier and is movable between a closed position against the forward facing surface of the object carrier and an open position displaced from the forward facing surface of the object carrier to enable access to the paperwork contained therein.

A data line 173, typically is a one wire serial bus line, extends through the body of the object carrier from the local controller 161 to a position aligned along the key slot 168 so as to be engaged and accessed by the touch memory button of the identification tag for the keys stored within the key slot, as discussed above. A form sensor 174 generally is mounted within the object enclosure 169, typically adjacent a lower corner thereof. The form sensor 174 generally is an infrared or photoelectric sensor, or similar type of sensing mechanism, adapted to detect the presence of a form identifier illustrated at dashed lines 176. The form identifier 176 generally is applied to the paperwork stored within the object enclosure, and typically comprises a reflective tape, although it also could include other types of sensor that communicate with or are detected by the form sensor 174 to indicate the presence of the paperwork in the object enclosure. The form identifier further can be printed with a desired ID code or matched with an ID corresponding to the touch memory button of the identification tag for the keys associated with the paperwork.

In use, therefore, the local controller of the object carrier 13" detects whether the appropriate paperwork is being tracked with its corresponding vehicle key. Thus, when the object carrier 13" is returned to the storage unit, if the paperwork is not present, an alarm can be raised to indicate a fault condition. In addition, the removal of the keys or documents is detected and recorded by the local controller of the job carrier 13" to indicate usage of the documents and/or keys for tracking the keys and associates job repair tickets, as well as providing service time logging such information.

The invention has been described herein in terms of preferred embodiments and methodologies. More specifically, the invention has primarily been described in terms of a system for tracking keys or other small objects that can be attached to a key card or enclosed in a container. While these are preferred applications of the invention, it will be understood that the invention is not intended to be limited only to the specific embodiments and applications discussed herein, rather virtually any type of objects that need to be tracked can be tracked with the present invention. Thus, a wide variety of additions, deletions, and modifications can be made to the embodiments illustrated herein without departing from the spirit and scope of the invention as set forth in the claims.

What is claimed is:

1. A method of tracking use of objects of a set of objects checked out from a storage means, comprising:

placing the objects to be tracked in object holders mounted on a portable object carrier;

removing selected ones of the objects from their object holders as needed for use of each such object;

actuating a timer associated with each object of the set of objects as each object is placed in its object holder, stopping each timer upon removal of its object from the object holder, restarting each timer as its object is replaced in the object holder to generate a time record, replacing the removed objects in their object holders on the object carrier after use; and comparing the time record for each object with a record of time the portable object carrier has been checked out from the storage means to determine whether an individual object of the set of objects was used.

2. A mobile tracking system for tracking use of objects of a set of objects, comprising:

at least one potable object carrier having a series of object holders in which each individual object of the set of objects is received and stored;

a series of identification tags to which each individual object is mounted, each identification tag being received within one of said object holders, and having a memory device having an internal timer for counting a period of time; and wherein said object carrier includes an on-board controller having an internal clock for counting a period of time and which communicates with a system controller to transmit information regarding the periods of time counted by each said memory device for each object stored on said object carrier and said controller of said object carrier to said system controller to determine how long each individual object was used based upon a comparison of the time counted by said memory device associated with each object and the time counted by said controller of said object carrier.

3. A method of tracking the occurrence and duration of the removal of objects from a storage location comprising the steps of marking the passage of time at the storage location, providing a timer on each of the objects with each timer having a run state and a stop state, for each object, placing its timer in one state when the object is stored at the storage location, placing its timer in the other state when the object is removed from the storage location, and periodically comparing the marked time at the storage location with the timer of each object to determine which objects were removed and the duration of the removals.

4. The method of claim 3 and wherein each timer is placed in its run state when stored at the storage location and is placed in its stop state when removed from the storage location.

* * * * *